（12）United States Patent
Edlund

(10) Patent No.: US 7,632,321 B2
(45) Date of Patent: *Dec. 15, 2009

(54) FUEL PROCESSING SYSTEMS, FUEL CELL SYSTEMS, AND IMPROVED FEEDSTOCKS THEREFOR

(75) Inventor: David J. Edlund, Bend, OR (US)

(73) Assignee: Idatech, LLC, Bend, OR (US)

( * ) Notice: Subject to any disclaimer, the term of this patent is extended or adjusted under 35 U.S.C. 154(b) by 384 days.

This patent is subject to a terminal disclaimer.

(21) Appl. No.: 11/520,522

(22) Filed: Sep. 12, 2006

(65) Prior Publication Data

US 2007/0113475 A1 May 24, 2007

Related U.S. Application Data

(63) Continuation-in-part of application No. 10/016,807, filed on Nov. 1, 2001, now Pat. No. 7,201,783.

(51) Int. Cl.
*C01B 3/32* (2006.01)
*B01D 53/22* (2006.01)
*G05B 9/00* (2006.01)

(52) U.S. Cl. .................. 48/127.7; 48/214 A; 422/117; 422/190; 429/17; 429/19

(58) Field of Classification Search ............... 48/127.7, 48/214 A, 61; 422/190, 117; 429/19, 17; 423/651; 44/410, 385

See application file for complete search history.

(56) References Cited

U.S. PATENT DOCUMENTS 3,336,730 A 8/1967 McBride et al.
3,350,176 A 10/1967 Green et al.

(Continued)

FOREIGN PATENT DOCUMENTS

EP 1243636 A1 9/2002

(Continued)

OTHER PUBLICATIONS

English-language abstract of Japanese Patent Publication No. JP 10203801, 1998.

(Continued)

*Primary Examiner*—N. Bhat
(74) *Attorney, Agent, or Firm*—D'Ascenzo Intellectual Property Law, P.C.

(57) ABSTRACT

Improved feedstocks for hydrogen-producing fuel processing and fuel cell systems, and fuel processing and fuel cell systems incorporating the same. The fuel processing systems include a fuel processor adapted to produce a product hydrogen stream from at least one feed stream containing at least a carbon-containing feedstock and an aversive agent. The fuel processing systems may also include a fuel cell stack adapted to produce an electric current from the product hydrogen stream. The feedstock is at least substantially formed of a hydrocarbon or alcohol. In some instances the feedstock includes methanol and the aversive agent is delivered to a hydrogen-producing region of the fuel processor with the carbon containing feedstock. The aversive agent can include at least one odorant, flavorants regurgitant, and/or dye. In other instances, the feed stream includes water or the feed stream is delivered to a fuel stack that produces and electric current therefrom.

31 Claims, 1 Drawing Sheet

U.S. PATENT DOCUMENTS

| | | | |
|---|---|---|---|
| 3,409,421 A | | 11/1968 | Belo et al. |
| 3,469,944 A | | 9/1969 | Bocard et al. |
| 4,098,959 A | | 7/1978 | Fanciullo |
| 4,319,886 A | | 3/1982 | Gold et al. |
| 4,438,046 A | | 3/1984 | Grew et al. |
| 4,445,909 A | | 5/1984 | Burns |
| 5,266,080 A | * | 11/1993 | Kiovsky et al. ............... 44/312 |
| 5,302,470 A | | 4/1994 | Okada et al. |
| 5,401,589 A | | 3/1995 | Palmer et al. |
| 5,432,710 A | | 7/1995 | Ishimaru et al. |
| 5,637,414 A | | 6/1997 | Inoue et al. |
| 5,725,794 A | | 3/1998 | Bruhnke et al. |
| 5,782,936 A | * | 7/1998 | Riley ........................... 44/300 |
| 5,861,137 A | | 1/1999 | Edlund |
| 5,891,919 A | | 4/1999 | Blum et al. |
| 5,932,181 A | | 8/1999 | Kim et al. |
| 5,932,529 A | | 8/1999 | Storey |
| 5,984,983 A | * | 11/1999 | Asgaonkar et al. ............ 44/385 |
| 5,997,594 A | | 12/1999 | Edlund et al. |
| 6,045,933 A | * | 4/2000 | Okamoto ...................... 429/17 |
| 6,083,637 A | | 7/2000 | Walz et al. |
| 6,152,995 A | | 11/2000 | Edlund |
| 6,159,256 A | * | 12/2000 | Bonville et al. ................ 48/61 |
| 6,180,272 B1 | | 1/2001 | Byrne et al. |
| 6,221,117 B1 | | 4/2001 | Edlund et al. |
| 6,319,306 B1 | | 11/2001 | Edlund et al. |
| 6,494,937 B1 | | 12/2002 | Edlund et al. |
| 6,572,837 B1 | * | 6/2003 | Holland et al. ........... 423/648.1 |
| 6,759,016 B2 | * | 7/2004 | Sederquist et al. .......... 422/196 |
| 6,985,331 B2 | | 1/2006 | Oishi et al. |
| 7,201,783 B2 | * | 4/2007 | Edlund ...................... 48/127.7 |
| 2002/0083645 A1 | | 7/2002 | Edlund |
| 2003/0215374 A1 | | 11/2003 | Wheeldon et al. |
| 2004/0126643 A1 | | 7/2004 | Kinkelaar et al. |
| 2004/0155065 A1 | | 8/2004 | Kinkelaar et al. |
| 2005/0081433 A1 | | 4/2005 | Ren et al. |
| 2006/0014069 A1 | | 1/2006 | Kaye et al. |
| 2008/0008914 A1 | | 1/2008 | Edlund |

FOREIGN PATENT DOCUMENTS

| | | | |
|---|---|---|---|
| GB | 2 283 235 | * | 3/1995 |
| GB | 2283235 | | 3/1995 |
| JP | 2003-217634 | | 7/2003 |
| WO | WO 90/03421 | | 4/1990 |
| WO | WO 2004/102717 | | 11/2004 |

OTHER PUBLICATIONS

English-language abstract of Japanese Patent Publication No. JP 08060167, 1996.

English-language abstract of Japanese Patent Publication No. JP 04173895, 1992.

* cited by examiner

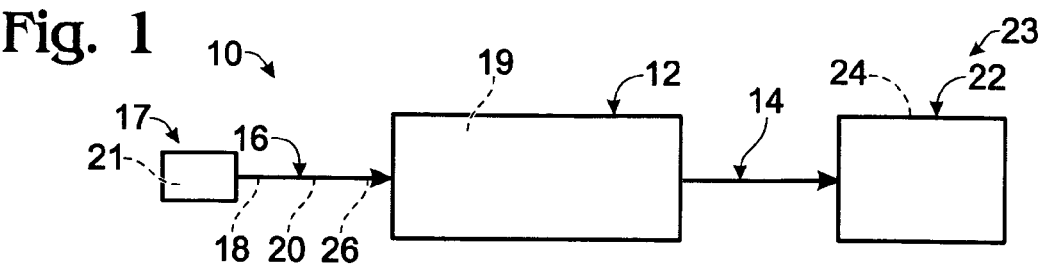
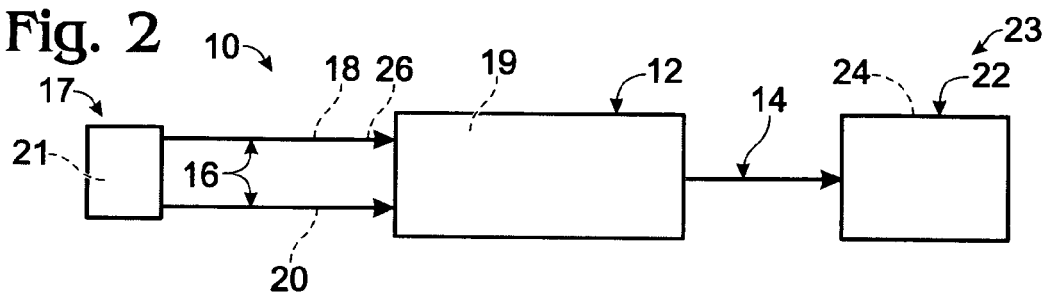
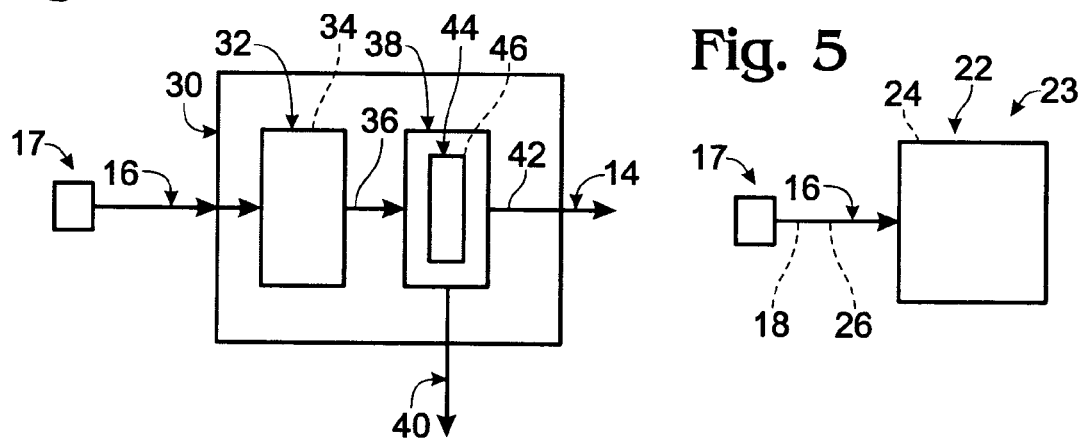
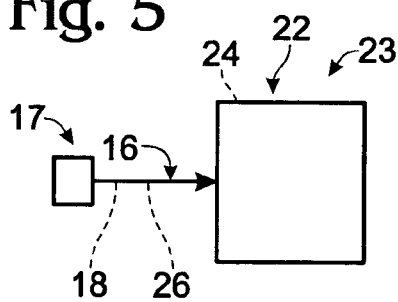
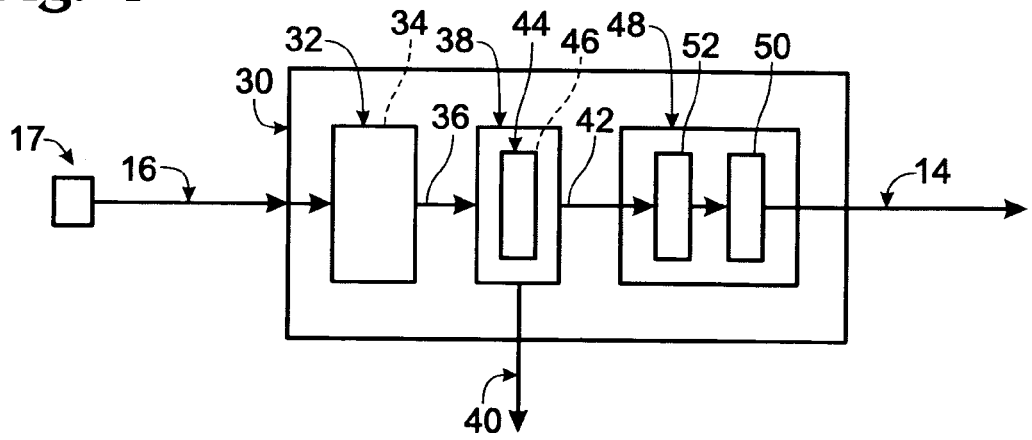

FUEL PROCESSING SYSTEMS, FUEL CELL SYSTEMS, AND IMPROVED FEEDSTOCKS THEREFOR

RELATED APPLICATION

This application is a continuation-in-part application that claims priority to U.S. patent application Ser. No. 10/016,807, which was filed on Nov. 1, 2001 now U.S. Pat. No. 7,201,783, is entitled "Fuel Processing System and Improved Feedstock Therefor" and the complete disclosure of which is hereby incorporated by reference for all purposes.

FIELD OF THE DISCLOSURE

The present invention relates generally to fuel processing systems and fuel cell systems, and more particularly to improved feedstocks for hydrogen-producing fuel processing systems and fuel cell systems, fuel processing systems utilizing these feedstocks, and fuel cell systems utilizing these feedstocks.

BACKGROUND AND SUMMARY OF THE DISCLOSURE

A hydrogen-producing fuel processing system includes a fuel processor that produces hydrogen gas from a carbon-containing feedstock, and in some embodiments, water. Examples of suitable fuel processors include steam reformers and autothermal reformers that utilize a reforming catalyst to produce hydrogen gas from the carbon-containing feedstock and water. A fuel cell stack produces an electric current from fuel and an oxidant. A fuel processing system may, but does not necessarily, include a fuel cell stack that produces an electric current from the hydrogen gas produced by the fuel processor. Some fuel cell stacks receive a fuel other than hydrogen gas, such as methanol, and may form a portion of a fuel cell system that does not include a hydrogen-producing fuel processor.

Examples of suitable carbon-containing feedstocks include hydrocarbons and alcohols. Methanol is an ideal feedstock for use in a fuel processing system, especially when the hydrogen gas produced in the fuel processor is delivered to a low-temperature fuel cell stack, such as fuel cell stacks that include proton-exchange membrane (PEM) fuel cells or alkaline fuel cells. Methanol may also be used as a fuel for some fuel cell stacks, such as direct methanol fuel cell stacks.

However, methanol also poses health hazards because it is a toxic alcohol (by inhalation of vapors, contact with the liquid, and ingestion of the liquid). Methanol also has very little odor and is considered tasteless. Thus, it is difficult to smell methanol if it is spilled or leaks from a storage device, fuel processor, transport conduit, or the like. Further, a person or animal could mistakenly ingest methanol due to its lack of taste and/or odor, for example believing it to be a harmless liquid, such as water. Therefore, there is a need for a suitable method for detecting methanol that leaks, spills, or is otherwise unintentionally released. Conventional odorants used with natural gas are not suitable for use in fuel processing systems because these odorants are alkyl thiols that poison the reforming catalyst, thereby destroying the utility of the fuel processor.

SUMMARY OF THE DISCLOSURE

The present disclosure is directed to improved feedstocks for hydrogen-producing fuel processing systems, direct methanol and fuel cell systems, to fuel processing systems incorporating the same, and to fuel cell systems incorporating the same. The hydrogen-producing fuel processing systems include a fuel processor adapted to produce a product hydrogen stream from at least a carbon-containing feedstock. The fuel processing system may also include a fuel cell stack adapted to produce an electric current from the product hydrogen stream and an oxidant. In such an embodiment, the fuel processing system may be referred to as a fuel cell system. The fuel cell systems may alternatively include a fuel cell stack that is adapted to produce an electric current from a carbon-containing feedstock and an oxidant. The feedstock is at least substantially formed of a hydrocarbon or alcohol. In an exemplary embodiment, the feedstock includes methanol. In some embodiments, the feedstock also includes water, such as at least 25 wt % water. The feedstock also includes at least one aversive agent configured to deter ingestion of the feedstock by persons or animals in the vicinity of the feedstock.

In some examples, the aversive agent includes a flavorant configured to produce a taste distinct from the carbon-containing feedstock. In some examples, the aversive agent includes an odorant adapted to produce a strong and characteristic odor distinct from the carbon-containing feedstock, even when present in only low concentrations. In some examples, the aversive agent is a regurgitant or a dye. In some examples, the aversive agent is selected to be free, or at least sufficiently free, from compounds that will poison the catalyst used in the fuel processor.

BRIEF DESCRIPTION OF THE DRAWINGS

FIG. 1 is a schematic diagram of a hydrogen-producing fuel processing system adapted to consume a carbon-containing feedstock according to the present disclosure.

FIG. 2 is a schematic diagram of another hydrogen-producing fuel processing system adapted to consume a carbon-containing feedstock according to the present disclosure.

FIG. 3 is a schematic diagram of an illustrative, non-exclusive example of a fuel processing system according to the present disclosure.

FIG. 4 is a schematic diagram of another illustrative, non-exclusive example of a fuel processor suitable for use in fuel processing systems according to the present disclosure.

FIG. 5 is a schematic diagram of a fuel cell system with a fuel cell stack adapted to consume a carbon-containing feedstock according to the present disclosure.

DETAILED DESCRIPTION AND BEST MODE OF THE DISCLOSURE

A hydrogen-producing fuel processing system according to the present disclosure is shown in FIG. 1 and generally indicated at 10. System 10 includes at least one fuel processor 12 that is adapted to produce a product hydrogen stream 14 containing hydrogen gas from a feed stream 16 containing at least a carbon-containing feedstock 18 and an aversive agent 26. Carbon-containing feedstock 18 includes at least one hydrocarbon or alcohol. Examples of suitable hydrocarbons include methane, propane, natural gas, diesel, kerosene, gasoline and the like. Examples of suitable alcohols include methanol, ethanol, and polyols such as ethylene glycol and propylene glycol.

Fuel processor 12 may produce hydrogen gas from carbon-containing feedstock 18 through any suitable mechanism. Examples of suitable mechanisms include steam reforming and autothermal reforming, in which reforming catalysts are used to produce hydrogen gas from carbon-containing feedstock 18 and water 20. When present in feed stream 16, water will typically form at least 25 wt % of the feed stream. Another suitable mechanism for producing hydrogen gas is catalytic partial oxidation of an alcohol or hydrocarbon. Fuel processor 12 includes at least one hydrogen-producing region 19 in which hydrogen gas is produced from the portion of feed stream that is delivered thereto. In some embodiments, the feed stream includes water, a carbon-containing feedstock, and an aversive agent, with all of these components being delivered to the hydrogen-producing region.

Fuel processor 12 has been schematically illustrated in FIG. 1 and may include additional components, such as feedstock delivery systems, heating assemblies, fuel cell stacks, purification regions, vaporizers, controllers, heat exchangers, and the like. U.S. patent application Ser. No. 11/263,726 discloses examples of hydrogen-producing fuel processing assemblies, fuel cell systems containing the same, and various components for use therewith. Additional illustrative, nonexclusive examples of suitable hydrogen generation assemblies, and components thereof, are disclosed in U.S. Pat. Nos. 6,221,117, 5,997,594, 5,861,137, and pending U.S. Patent Application Publication Nos. 2001/0045061, 2003/0192251, and 2003/0223926. The complete disclosures of the above-identified patents and patent applications are hereby incorporated by reference for all purposes not inconsistent with the present disclosure.

Although only a single feed stream 16 is shown in FIG. 1, it should be understood that more than one stream 16 may be used and that these streams may contain the same or different components. When carbon-containing feedstock 18 is miscible with water, the feedstock is typically delivered with the water component of feed stream 16, such as shown in FIG. 1. When carbon-containing feedstock 18 is immiscible or only slightly miscible with water, these components are typically delivered to fuel processor 12 in separate streams such as shown in FIG. 2.

Feed stream 16 may be delivered to fuel processor 12 via any suitable mechanism. Hydrogen-producing fuel processing systems 10 according to the present disclosure may include a feedstock delivery system 17 that is adapted to selectively deliver at least one feed stream 16 to at least the hydrogen-producing region of the fuel processing assembly. In some embodiments, the feedstock delivery system is further adapted to at least selectively deliver a fuel stream to a burner or other heating assembly that is adapted to heat at least the hydrogen-producing region 19, such as to heat (and optionally maintain) the region at a suitable hydrogen-producing temperature. Feedstock delivery system 17 may utilize any suitable delivery mechanism.

In some embodiments, the feed stream may be a gaseous feed stream that is delivered from a pressurized source, which may form a portion of the feedstock delivery system or which may be in fluid communication with the feedstock delivery system. In some embodiments, the feed stream may be a liquid feed stream (such as which contains a liquid alcohol or liquid hydrocarbon) that is delivered from a source, or supply, which similarly may form a portion of the feedstock delivery system or which may be in fluid communication with the feedstock delivery system. In such an embodiment, the feedstock may be vaporized in hydrogen-producing region 19 of fuel processor 12, or prior to delivery to the hydrogen-producing region. In FIGS. 1 and 2, feedstock delivery system 17 is schematically illustrated including at least one source, or supply, 21, but this is not required to all embodiments. Illustrative, non-exclusive examples of suitable sources or supplies include reservoirs, tanks, and the like.

According to the present disclosure, feedstock delivery system 17 is adapted to draw or otherwise receive the components of feed stream 16 from a supply, or source, and to deliver a feed stream 16 for use in at least the hydrogen-producing region of the fuel processing assembly. The components of feed stream 16 may be premixed prior to being delivered to the fuel processor, such as being stored in a common supply. As another example, at least one of the components of feed stream 16 may be added to other components of the feed stream prior to delivery of the feed stream to fuel processor 12. As a further example, the feedstock delivery system may be adapted to mix two or more components of the feed stream, such as by drawing these components from separate sources or supplies. In some embodiments, the carbon-containing feedstock and aversive agent may be premixed, but this is not required to all embodiments. In some embodiments, the carbon-containing feedstock, water, and aversive agent may be premixed.

As indicated in FIGS. 1 and 2, fuel processing system 10 may, but does not necessarily, further include at least one fuel cell stack 22. Fuel cell stack 22 contains at least one, and typically multiple, fuel cells 24 adapted to produce an electric current from the portion of the product hydrogen stream delivered thereto and air or another suitable oxidant. Similar to fuel processor 12, fuel cell stack 22 has also been schematically illustrated and may include additional components, such as air delivery systems, coolant systems, power management components, controllers, and the like. Illustrative, non-exclusive examples of suitable fuel cells include proton exchange membrane (PEM) fuel cells, solid oxide fuel cells, and alkaline fuel cells, although others may be used within the scope of the present disclosure. Some or all of stream 14 may additionally, or alternatively, be delivered, via a suitable conduit, for use in another hydrogen-consuming process, burned for fuel/heat, or stored for later use. Examples of suitable storage mechanisms include pressurized tanks and hydride beds. When a hydrogen-producing fuel processing system 10 includes a fuel cell stack 22, it may be referred to as a fuel cell system 23.

In some examples, a fuel cell system according to the present disclosure may include a fuel cell stack 22 configured to produce an electric current directly from feed stream 16. A preferred, but non-exclusive, example of such a fuel cell stack 22 is one including a direct methanol fuel cell with methanol as the carbon-containing feedstock. A direct methanol fuel cell may receive methanol as a fuel and produce electricity therefrom by oxidizing the methanol with a catalyst. Another example of a fuel cell stack 22 configured to produce an electric current directly from feed stream 16 is one including a direct ethanol fuel cell stack with ethanol as the carbon-containing feedstock.

As discussed above, carbon-containing feedstock 18 may include any suitable hydrocarbon or alcohol. An illustrative, non-exclusive example of a suitable carbon-containing feedstock is methanol, including fuel-cell grade methanol. Generally, catalysts that are used for conducting the water-gas shift reaction are suitable for steam reforming methanol. Commonly used (and commercially available) methanol steam-reforming catalysts consist of mixtures of copper and zinc oxide, and copper and chromium oxide. These catalyst formulations are very rapidly and completely poisoned by compounds of sulfur, compounds of phosphorous, volatile heavy metals (e.g., cadmium, mercury), and compounds of heavy metals. Therefore, the methanol is preferably free from these compounds so that the reforming catalyst is not poisoned. Similarly, other carbon-containing feedstocks should be sufficiently free from these or other compounds if they are likely to poison the reforming or other catalysts used to produce hydrogen gas therefrom. Because methanol is toxic, it poses a health hazard if ingested or inhaled. Because methanol is generally odorless, tasteless, and colorless it may not be readily identified or noticed if spilled or unintentionally discharged from the fuel processing system. Further, a person or animal may mistakenly ingest methanol or another liquid carbon-containing feedstock believing it to be some harmless liquid.

As discussed, feed streams 16 according to the present disclosure, contain at least carbon-containing feedstock 18 and at least one aversive agent 26. An aversive agent refers to an additive that deters ingestion or inhalation of a liquid. Aversive agent 26 may include an odorant, a flavorant, a regurgitant, a-dye, and/or combinations thereof.

In general, aversive agent 26 may be completely, or sufficiently, free of compounds that will impair the operation of fuel processing system 10, such as compounds that will poison the catalyst used in fuel processor 12 and/or fuel cell stack 22, when the fuel cell stack receives feedstock 18 as a fuel, or reactant. For example, aversive agent 26 may be selected to only include trace, or even to be free of, sulfur, phosphorous and/or heavy metals. Although not required to all embodiments, aversive agent 26 also may be selected to have a low molecular weight. By "low molecular weight," it is meant that these compounds have a molecular weight less than approximately 1000. Aversive agents with molecular weights outside of this range are also within the scope of the present disclosure. Aversive agent 26 should be partially, or completely, miscible with methanol or the other carbon-containing feedstock with which the aversive agent is used.

The aversive agent may be selected such that it does not adversely affect the components of the fuel processing system and/or fuel cell system that are exposed to the aversive agent. Selecting the aversive agent according to these criteria may obviate the need to remove it prior to its introduction to fuel processor 12 or fuel cell stack 22 where the feed stream is consumed. For example, aversive agents that have low molecular weights and/or that do not crystallize to salts when feed stream 16 is vaporized may avoid adversely affecting the fuel processing equipment, catalysts, or corresponding reactions. However, aversive agents that should be removed prior to being introduced to the fuel processor or fuel cell stack are within the scope of the present disclosure. Similarly, fuel processing systems and/or fuel cell systems that are configured to remove the aversive agent from the feed stream prior to vaporization and/or In some examples, aversive agent 26 may include an odorant. The odorant should produce a strong and detectable odor that is distinct from any odor of other components of feed stream 16, even when the odorant is present in low concentrations. Preferably, the odorant produces a characteristic odor. Even more preferably, the odorant produces a distasteful odor. By "characteristic odor," it is meant that the odor is distinct from the carbon-containing feedstock and readily detectable in the environment surrounding the fuel processing system and/or fuel cell system by not being an odor commonly present in such an environment. Therefore, even when the odorant is used with a carbon-containing feedstock that itself has an odor, the characteristic smell of the odorant will be detectable. By "distasteful," it is meant that the odor smells rotten, such as smelling like rotting eggs, fish, flesh, etc. This is particularly useful when the carbon-containing feedstock is toxic or otherwise hazardous if ingested because the distasteful smell of the odorant will disincline ingestion of the carbon-containing feedstock/odorant mixture, even if the individual does not know that the mixture is toxic or otherwise hazardous. Further, the odorant may be selected to be volatile. By "volatile," it is meant that the odorant has a boiling point of less than approximately 300° C., and in some embodiments, less than 200° C., less than 100° C., less than 50° C., or even less than 0° C.

Any suitable odorant meeting the criteria set forth herein may be used. Illustrative, non-exclusive examples of suitable odorants include organic amines with at least one amine functional group. The following table lists several candidate organic amines and their melting and boiling points.

TABLE 1

Physical Properties of Organic Amines

| Odorant | Melting Point (° C.) | Boiling Point (° C.) |
|---|---|---|
| Trimethylamine | −117 | 3-4 |
| Triethylamine | −115 | 88.8 |
| Tripropylamine | −93.5 | 155-158 |
| n-Butylamine | −50.5 | 77.9 |
| n-Pentylamine | −50 | 104 |
| n-Hexylamine | −23 | 131-132 |
| n-Heptylamine | −23 | 154-156 |
| n-Octylamine | −5 | 175-177 |
| n-Decylamine | 12-14 | 216-218 |
| 1,3-Diaminopropane | −12 | 140 |
| 1,4-Diaminobutane | 27-28 | 158-160 |
| 1,5-Diaminopentane | 9 | 178-180 |
| 1,7-Diaminoheptane | 27-29 | 147-149 |

All of these odorants have a characteristically unpleasant odor that is detectable at very low concentrations and which is distinct from methanol, ethanol, and other carbon-containing feedstocks 18 used in feed streams for hydrogen-producing fuel processing systems and fuel cell systems. For instance, trimethylamine has a characteristic "rotten fish" odor that is easily smelled when trimethylamine is dissolved in methanol/water mixtures at a concentration of 10 ppm (parts per million by volume). Trimethylamine is available as a 40% solution in water from Aldrich Chemical Co. of Milwaukee, Wis.

Experiments using trimethylamine doped methanol/water solution (10 ppm trimethylamine added to a methanol/water mixture containing 67 vol % methanol and 33 vol % water) have shown that the activity of a commercial copper/zinc oxide reforming catalyst (G66B, sold by Süd-Chemie of Louisville, Ky.) is unaffected by the trimethylamine.

Although these volatile organic amines are effective odorants, they also offer an additional advantage of deterring human consumption due to their distasteful smell. In particular, trimethylamine smells like rotten fish, whereas 1,4-diaminobutane and 1,5-diaminopentane have smells characteristic of rotten flesh (hence their trivial names of putrescine and cadaverine, respectively).

In some examples, aversive agent 26, includes a flavorant configured to produce a taste in feed stream 16 that is distinct from the taste of carbon-containing feedstock 18. A flavorant refers to an aversive agent that imparts a taste to a liquid when added thereto. By producing a taste distinct from the taste of carbon-containing feedstock 18, the flavorant may deter ingestion of the feed stock. For example, the distinct taste may indicate to a person or animal that feed stream 16 is something other than water or another liquid that is safe for consumption. When methanol is used as the carbon-containing feedstock, a flavorant with any perceptible taste will produce a taste distinct from the carbon-containing feedstock because methanol is tasteless.

In some examples, the flavorant may be configured to produce unpleasant tastes in feed stream 16. Unpleasant tastes refer to tastes considered unpalatable by most persons such as, for example, bitter, spicy, sour, spoiled, or rotten tastes. Further, unpleasant tastes can arise from different taste combinations, such as the combined bitter and spicy taste resulting from the compound denatonium capsaicinate. Unpleasant tastes may deter ingestion of feed stream 16 because most persons and animals have natural aversions to ingesting things with unpleasant tastes.

The flavorant may include any number of compositions or combinations thereof. One exemplary and non-exclusive example is denatonium benzoate, sold under the trade name Bitrex by Macfarlan Smith. Bitrex produces an intense bitter taste when dissolved in liquids at relatively small quantities. For example, Bitrex is recognizably bitter at 50 parts per billion and readily detectible at 50 parts per million. Other examples of ingestion deterrents are capsaicin (natural or synthetic), denatonium capsaicinate, quinine hydrochloride, sucrose octaacetate, and saccharide.

In some examples, aversive agent 26 includes a regurgitant configured to deter ingestion of harmful quantities of a liquid. A "regurgitant," is a compound that induces vomiting when ingested. One exemplary and non-exclusive example of a regurgitant is ipecac syrup. When aversive agent 26 includes a regurgitant, a small quantity of feed stream 16 may be ingested before the regurgitant induces vomiting; however, preferably the regurgitant concentration is selected such that vomiting is induced upon ingestion of only small quantities of feed stream 16.

Further, aversive agent 26 may include a dye configured to deter ingestion of feed stream 16. A dye refers to an additive that is configured to change the color of a liquid. In some examples, the dye may deter ingestion by changing the color of feed stream 16 to a color generally associated with a warning, such as red. In some examples, the dye may change the color of feed stream 16 to something appearing unnatural to ingest, such as, for example, fluorescent yellow or black. In still other examples, the dye may give an otherwise clear or colorless feed stream a tint or color.

As discussed, an illustrative, non-exclusive example of a suitable hydrogen-producing fuel processor 12 is a steam reformer. An example of a suitable steam reformer is shown in FIG. 3 and indicated generally at 30. Reformer 30 includes a reforming, or hydrogen-producing, region 32 that includes a steam reforming catalyst 34. Alternatively, reformer 30 may be an autothermal reformer that includes an autothermal reforming catalyst. In region 32, a hydrogen-containing stream 36 is produced from the water and carbon-containing feedstock forming feed stream(s) 16. Hydrogen gas is a majority component of the hydrogen-containing stream. The hydrogen-containing stream may contain impurities, and therefore may be delivered to a separation region, or purification region, 38, where at least some of these impurities are removed from the hydrogen-containing stream. In separation region 38, the hydrogen-containing stream is separated into one or more byproduct streams 40 and a hydrogen-rich stream 42 by any suitable pressure-driven separation process. In FIG. 3, hydrogen-rich stream 42 is shown forming product hydrogen stream 14.

An example of a suitable structure for use in separation region 38 is a membrane module 44, which contains one or more hydrogen permeable metal stream 42 by any suitable pressure-driven separation process. In FIG. 3, hydrogen-rich stream 42 is shown forming product hydrogen stream 14.

An example of a suitable structure for use in separation region 38 is a membrane module 44, which contains one or more hydrogen permeable metal membranes 46. An example of a suitable membrane module formed from a plurality of hydrogen-selective metal membranes is disclosed in U.S. Pat. No. 6,221,117, which was filed on Apr. 13, 1999 as U.S. patent application Ser. No. 09/291,447, entitled "Hydrogen Producing Fuel Processing System," the complete disclosure of which is hereby incorporated by reference. In that application, a plurality of generally planar membranes are assembled together into a membrane module having flow channels through which an impure gas stream is delivered to the membranes, a purified gas stream is harvested from the membranes and a byproduct stream is removed from the membranes. Gaskets, such as flexible graphite gaskets, are used to achieve seals around the feed and permeate flow channels. Other examples are disclosed in U.S. Pat. Nos. 6,319,306 and 6,494,937, the complete disclosures of which are hereby incorporated by reference. Other suitable fuel processors are also disclosed in the incorporated patent applications.

The thin, planar, hydrogen-permeable membranes are preferably composed of palladium alloys, most especially palladium with 35 wt % to 45 wt % copper. These membranes are typically formed from a thin foil that is approximately 0.001 inches thick. It is within the scope of the present invention, thinner, with commensurate increase in hydrogen flux. The hydrogen-permeable membranes may be arranged in any suitable configuration, such as arranged in pairs around a common permeate channel as is disclosed in the incorporated patent application. The hydrogen permeable membrane or membranes may take other configurations as well, such as tubular configurations.

Another example of a suitable pressure-separation process is pressure swing absorption (PSA). Therefore, region 38 may alternatively include suitable structure for performing pressure swing absorption.

Reformer 30 may, but does not necessarily, further include a polishing region 48, such as shown in FIG. 4. Polishing region 48 receives hydrogen-rich stream 42 from separation region 38 and further purifies the stream by reducing the concentration of, or removing, selected compositions therein. For example, when fuel processing system 10 includes a fuel cell stack, or when product hydrogen stream 14 is intended for use in a fuel cell stack, compositions that may damage the fuel cell stack, such as carbon monoxide and carbon dioxide, may be removed from the hydrogen-rich stream. Region 48 includes any suitable structure for removing or reducing the concentration of the selected compositions in stream 42. For example, when the product stream is intended for use in a PEM fuel cell stack or other device that will be damaged if the stream contains more than determined concentrations of carbon monoxide or carbon dioxide, it may be desirable to include at least one methanation catalyst bed 50. Bed 50 converts carbon monoxide and carbon dioxide into methane and water, both of which will not damage a PEM fuel cell stack. Polishing region 48 may also include another hydrogen-producing device 52, such as another reforming catalyst bed, to convert any unreacted feedstock into hydrogen gas. In such an embodiment, it is preferable that the second reforming catalyst bed is upstream from the methanation catalyst bed so as not to reintroduce carbon dioxide or carbon monoxide downstream of the methanation catalyst bed.

As discussed, it is also within the present disclosure that a feed stream 16 that contains at least a carbon-containing feedstock 18 and an aversive agent 26 may be delivered as a fuel, or reactant, stream to a fuel cell stack 22 that is adapted to consume the feed stream as a fuel for producing an electric current. As also discussed, an illustrative, non-exclusive example of such a fuel cell is a direct methanol fuel cell. FIG. 5 schematically illustrates a fuel cell system 23 that includes such a fuel cell stack 22 and fuel stream 16. Also shown is a feedstock delivery system 17, which may deliver the feed stream to the fuel cell stack, such as from one or more suitable supplies or sources. Similar to the previously discussed feedstock delivery systems for fuel processors, the feedstock delivery system may include the one or more sources or supplies containing the components of the feed stream and/or it may be in fluid communication with sources or supplies for the components.

INDUSTRIAL APPLICABILITY

The feed streams of the present disclosure are applicable in any fuel processing system in which hydrogen gas is produced from the feed stream and/or any fuel cell system in which an electric current is produced from the feed stream. The feed streams of the present disclosure are particularly useful when the carbon-containing feedstock is methanol, although it may be used with other hydrocarbons and alcohols.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A fuel processing system, comprising:
a feedstock supply containing at least a carbon-containing feedstock and an aversive agent having a different composition than the carbon-containing feedstock, wherein the carbon-containing feedstock includes an alcohol that is a liquid at 25° C. and 1 atm, wherein the aversive agent includes at least one of an odorant that imparts an odor to the carbon-containing feedstock that is distinct from an odor of the carbon-containing feedstock, a flavorant that imparts a taste to the carbon-containing feedstock that is distinct from any taste of the carbon-containing feedstock, and a regurgitant, and further wherein the aversive agent is at least substantially free from sulfur compounds;
a feed stream containing at least a mixture of the carbon-containing feedstock and the aversive agent from the feedstock supply; and
a hydrogen-producing fuel processor in fluid communication with the feedstock supply and adapted to produce a product hydrogen stream containing hydrogen gas from the feed stream, wherein the fuel processor includes at least one hydrogen-producing region containing a reforming catalyst adapted to produce a mixed gas stream containing hydrogen gas and other gases from the feed stream, and further hydrogen gas forms at least a majority of the mixed gas stream.

2. The fuel processing system of claim 1, wherein the fuel processing system further includes a feedstock delivery system adapted to deliver the feed stream to the fuel processor.

3. The fuel processing system of claim 1, wherein the feed stream further includes water.

4. The fuel processing system of claim 1, wherein the aversive agent is at least substantially miscible in the carbon-containing feedstock.

5. The fuel processing system of claim 1, wherein the aversive agent is at least substantially free of phosphorous and heavy metals.

6. The fuel processing system of claim 1, wherein the aversive agent is not removed from the feed stream prior to the feed stream being delivered to the hydrogen-producing region of the fuel processor.

7. The fuel processing system of claim 6, wherein the aversive agent is selected to not poison the reforming catalyst when brought in contact therewith.

8. The fuel processing system of claim 1, wherein the aversive agent has a boiling point of less than approximately 300° C.

9. The fuel processing system of claim 1, wherein the aversive agent has a molecular weight of less than 1000.

10. The fuel processing system of claim 1, wherein the aversive agent includes a flavorant selected to deter ingestion of the feed stream.

11. The fuel processing system of claim 10, wherein the flavorant has at least one of a bitter taste, a sour taste, and a spicy taste.

12. The fuel processing system of claim 10, wherein the flavorant is selected from the group consisting of denatonium benzoate, capsaicin, denatonium capsaicinate, quinine hydrochloride, sucrose octaacetate, saccharide, and the combinations and the derivatives thereof.

13. The fuel processing system of claim 10, wherein the flavorant has a readily detectable taste when present in a concentration of 50 ppm.

14. The fuel processing system of claim 1, wherein the aversive agent includes an odorant selected to deter ingestion of the feed stream.

15. The fuel processing system of claim 14, wherein the odorant includes at least one organic amine having at least one amine functional group.

16. The fuel processing system of claim 15, wherein the odorant includes an organic amine selected from the group consisting of trimethylamine, triethylamine, tripropylamine, n-butylamine, n-pentylamine, n-hexylamine, n-heptylamine, n-octylamine, and n-decylamine.

17. The fuel processing system of claim 16, wherein the odorant includes at least one organic amine having at least two amine functional groups.

18. The fuel processing system of claim 17, wherein the at least one organic amine is selected from the group consisting of 1,3-diaminopropane, 1,4-diaminobutane, 1,5-diaminopentane, and 1,7-diaminoheptane.

19. The fuel processing system of claim 1, wherein the aversive agent includes a flavorant and an odorant.

20. The fuel processing system of claim 1, wherein the aversive agent includes a regurgitant configured to induce vomiting.

21. The fuel processing system of claim 1, wherein the aversive agent further includes a dye configured to make the color of the feed stream distinct from the carbon-containing feedstock.

22. The fret processing system of claim 1, wherein the carbon-containing feedstock includes methanol.

23. The fuel processing system of claim 1, wherein the fuel processing system further includes a separation region adapted to receive the mixed gas stream and to separate the mixed gas stream into a hydrogen-rich stream containing at least substantially hydrogen gas and a byproduct stream containing at least a substantial portion of the other gases, and further wherein the product hydrogen stream is formed from the hydrogen-rich stream.

24. The fuel processing system of claim 23, wherein the separation region is adapted to produce the hydrogen-rich stream and the byproduct stream by a pressure-driven separation process.

25. The fuel processing system of claim 24, wherein the separation region is adapted to produce the hydrogen-rich stream and the byproduct stream via a pressure-swing adsorption process.

26. The fuel processing system of claim 24, wherein the separation region includes at least one hydrogen-permeable membrane, and further wherein the hydrogen-rich stream is formed from a portion of the mixed gas stream that passes through the membrane and the byproduct stream is formed from a portion of the mixed gas stream that does not pass through the membrane.

27. The fuel processing system of claim 1, further comprising a fuel cell stack adapted to receive at least a portion of the product hydrogen stream and including a plurality of fuel cells adapted to produce an electric current therefrom.

28. A fuel cell system, comprising:

a feedstock supply containing at least a carbon-containing feedstock and an aversive agent having a different composition than the carbon-containing feedstock, wherein the carbon-containing feedstock includes an alcohol that is a liquid at 25° C. and 1 atm, wherein the aversive agent includes at least one of an odorant that imparts an odor to the carbon-containing feedstock that is distinct from an odor of the carbon-containing feedstock, a flavorant that imparts a taste to the carbon-containing feedstock that is distinct from an taste of the carbon-containing feedstock, and a regurgitant and further wherein the aversive agent is at least substantially free from sulfur compounds;

a feed stream including at least a mixture of the carbon-containing feedstock and the aversive agent from the feedstock supply; and a fuel cell stack in fluid communication with the feedstock supply and configured to produce an electric current from the feed stream.

29. The fuel cell system of claim 28, further comprising a feedstock delivery system adapted to deliver the feed stream to the fuel cell stack.

30. The fuel cell system of claim 28, wherein the aversive agent includes a flavorant selected from the group of denatonium benzoate, capsaicin, denatonium capsaicinate, quinine hydrochloride, sucrose octaacetate, saccharide, and the combinations and the derivatives thereof.

31. The fuel cell system of claim 28, wherein the carbon-containing feedstock includes methanol.

* * * * *

UNITED STATES PATENT AND TRADEMARK OFFICE
CERTIFICATE OF CORRECTION

| | |
|---|---|
| PATENT NO. | : 7,632,321 B2 |
| APPLICATION NO. | : 11/520522 |
| DATED | : December 15, 2009 |
| INVENTOR(S) | : David J. Edlund |

It is certified that error appears in the above-identified patent and that said Letters Patent is hereby corrected as shown below:

Column 11,
Line 5, in the phrase "The fret processing system" please delete "fret" and insert -- fuel -- therefor.

Column 12,
Line 6, in the phrase "C. and 1 atm," please delete the "." and insert -- C and -- therefor.

Column 12,
Line 11, in the phrase "from an taste" please delete "an" and insert -- any -- therefor.

Signed and Sealed this

Second Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,632,321 B2
APPLICATION NO. : 11/520522
DATED : December 15, 2009
INVENTOR(S) : David J. Edlund It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 478 days.

Signed and Sealed this

Second Day of November, 2010

David J. Kappos
*Director of the United States Patent and Trademark Office*